United States Patent
Koller et al.

(10) Patent No.: US 12,540,201 B2
(45) Date of Patent: Feb. 3, 2026

(54) DECOLORATION OF POLYOLEFINS IN THE MELT STATE

(71) Applicant: Borealis AG, Vienna (AT)

(72) Inventors: Kerstin Koller, Wels (AT); Christoph Burgstaller, Wels (AT); Hermann Braun, Linz (AT); Peter Denifl, Linz (AT); Markus Gahleitner, Linz (AT)

(73) Assignee: BOREALIS GMBH, Vienna (AT)

( * ) Notice: Subject to any disclaimer, the term of this patent is extended or adjusted under 35 U.S.C. 154(b) by 715 days.

(21) Appl. No.: 17/942,620

(22) Filed: Sep. 12, 2022

(65) Prior Publication Data

US 2023/0085849 A1    Mar. 23, 2023

(30) Foreign Application Priority Data

Sep. 23, 2021 (EP) .................................... 21198611

(51) Int. Cl.
| | |
|---|---|
| *C08F 2/44* | (2006.01) |
| *C08F 10/02* | (2006.01) |
| *C08J 11/16* | (2006.01) |
| *C08K 3/20* | (2006.01) |

(52) U.S. Cl.
CPC .............. *C08F 2/44* (2013.01); *C08F 10/02* (2013.01); *C08J 11/16* (2013.01); *C08K 3/20* (2013.01); *C08J 2423/06* (2013.01)

(58) Field of Classification Search
USPC ............................................... 521/47
See application file for complete search history.

(56) References Cited

U.S. PATENT DOCUMENTS

2006/0148914 A1 * 7/2006 Connor .................. B29B 17/02
                                                         524/601

FOREIGN PATENT DOCUMENTS

| EP | 2816154 A1 | 12/2014 |
|---|---|---|
| EP | 3770208 A1 | 1/2021 |

OTHER PUBLICATIONS

European Search Report for Application No. 21198611.2-1102 Date: Mar. 3, 2022.

\* cited by examiner

*Primary Examiner* — Terressa Boykin
(74) *Attorney, Agent, or Firm* — Lippes Mathias LLP

(57) ABSTRACT

The present invention concerns a process for decolorizing a polyolefin composition, the process comprising the steps of a) providing a polyolefin composition comprising at least one polyolefin and at least one organic chromophore, b) mixing the polyolefin composition in a melt state at a temperature of 170 to 290° C. with an inorganic oxidizing agent, wherein the inorganic oxidizing agent is selected from the group of inorganic peroxides and hypochlorites, and c) obtaining a decolorized polyolefin composition.

15 Claims, No Drawings

DECOLORATION OF POLYOLEFINS IN THE MELT STATE

CROSS REFERENCE TO RELATED APPLICATIONS

This Application claims the benefit of European Application No. 21198611.2, filed Sep. 23, 2021, the contents of which are incorporated herein in their entirety.

The present invention relates to a process for decolorizing a polyolefin composition, the polyolefin composition comprising a polyolefin and an organic chromophore. The invention further relates to a decolorized polyolefin composition obtained by the process according to the invention, and the use of an inorganic oxidizing agent for decolorizing a polyolefin composition. Finally, the invention relates to a process for recycling a polyolefin composition.

Recycling of plastic and in particular waste plastic is nowadays a major issue in terms of environmental protection, energy saving and conserving resources. There are different routes of plastic recycling commonly known including mechanical recycling (i.e. material sorting), advanced physical or solvent based recycling and chemical processing (e.g. thermochemical recycling such as pyrolysis or gasification and solvolysis). Among these methods, mechanical recycling is the most widely practiced. One of the lingering issues in mechanical recycling of thermoplastic polymers is the removal of colors in order to be able to use them in the full color scale again.

Removal of surface layer(s) of protective colored varnishes from the surface of plastic parts, such as on automotive parts, or removal of ink-based printing elements from the surface of plastic parts, such as packaging articles, can in principle be achieved by e.g. washing with organic solvents in combination with other chemicals and/or mechanical means.

However, a particular problem is the removal of inorganic pigments, such as $TiO_2$ or other mineral pigments, and/or organic chromophores from the bulk of plastic materials and waste plastic. Reason is that the inorganic pigments and/or organic chromophores are not only present on surface(s) of the plastic or plastic parts, but are also distributed in the bulk of the plastic material or part. The removal of organic chromophores usually requires decomposition of the coloring substances by chemical means.

While having the lowest entropy loss and energy input requirement, mechanical recycling of thermoplastic polymers has some limitations in terms of properties and performance of the resulting products. Next to foreign polymer and non-polymeric contaminations limiting mechanical performance, problems appear in odor and emissions as well as in pigmentation. In absence of efficient color removal processes, only intensive color sorting allows producing natural or at least brightly colored recyclates in mechanical processes, however limiting the available volume. Otherwise, only recycled polymer material with dark colors can be achieved.

It is a general desire of recycling processes of the prior art to provide virgin-like polymers, i.e. polymers that are very similar, ideally identical, in their structures and properties to freshly polymerized polymers. Developing a suitable process for removing or decomposing organic chromophores from both printing and pigmentation of plastic materials and waste plastic is therefore of great interest. Preferably, said process as well as the involved chemical agents should not damage the chain structure of the polymer to be recycled, i.e. should not result in significant degradation.

US2006/0148914 relates to the use of chemical compositions useful for decolorizing recycle thermoplastics such as oxidizing agents, reducing agents, or photo-initiators combined into thermoplastics such as polypropylene (PP), polyethylene terephthalate (PET), polybutylene terephthalate (PBT), polycarbonates (PC), polyethylene (PE), polylactic acid (PLA), nylon, PET copolymers, acrylics, Surlyn™, or other thermoplastics. In one example, a radical initiator of a peroxide-containing compound assists in achieving decolorization of thermoplastics. No information on changes to or retention of the polymer structure are given.

Therefore, it is an object of the present invention to provide a process for decolorizing a colored polyolefin composition, in particular for decoloring the bulk of a colored polyolefin composition.

It is a further object of the present invention to provide a process for decolorizing a colored polyolefin composition wherein not only the organic chromophore present in the polyolefin composition is removed and/or decomposed, but at the same time also maintaining or not significantly degrading the chain structures of the polyolefin.

The present invention provides a process for decolorizing a polyolefin composition, the process comprising the steps of
  a) providing a polyolefin composition comprising at least one polyolefin and at least one organic chromophore,
  b) mixing the polyolefin composition in a melt state at a temperature of 170 to 290° C. with an inorganic oxidizing agent, wherein the inorganic oxidizing agent is selected from the group of inorganic peroxides and hypochlorites,
  c) obtaining a decolorized polyolefin composition.

In the present invention, it has been surprisingly found that an inorganic oxidizing agent being selected from the group of inorganic peroxides and hypochlorites is capable of decomposing organic chromophores typically used in printing and pigmentation of polymers, in particular in melt state. The decomposition of the organic chromophores results in a significant brightening, leaving behind only a very bright yellow tone in worst case. Such decoloring clearly increases the value of polymeric materials for purposes of recycling.

It has been further surprisingly found that, at the same time, the polymer chain structure of the polyolefin is affected much less than with organic peroxides, while giving better color removal. This means that the process in the melt state can be performed without significant degradation in case of polypropylene materials, and likewise without crosslinking in case of polyethylene materials. In other words, the process of the invention allows that the structural quality of the decolored polyolefin to be maintained, or at least not significantly degraded.

As used herein, the change in the melt flow rate (MFR2) of the polyolefin composition before and after the decolorization process is used as an indication of the degradation of the polymer chain of the polyolefin. The smaller the change in MFR2, the lesser the degradation of the polymer chain. As further used herein, the change in the oxidation induction time (OIT) of the polyolefin composition before and after the decolorization process is used as an indication of the thermal stability of the polyolefin composition. The smaller the change in OIT is, the better the retention of long-term stability.

In step a) of the process according to the invention, a polyolefin composition comprising a polyolefin and an organic chromophore is provided.

The polyolefin composition comprises at least one polyolefin. In other words, the polyolefin composition can comprise one polyolefin, or two or more polyolefins differing from each other. Preferably, the polyolefin has a density of 860 to 960 kg/m$^3$ measured according to ISO 1183 and/or a melting temperature Tm measured according to ISO 11357-3 of 60 to 170° C.

Preferably, the polyolefin is selected from the group of ethylene homo- or copolymers (PE) having a density of 860 to 960 kg/m$^3$, propylene homo- or copolymers (PP) having a density of 900 to 910 kg/m$^3$, or mixtures thereof.

Preferably, the ethylene homo- or copolymer (PE) has a melting point Tm of from 60 to 135° C.

Preferably, the propylene homo- or copolymer (PP) has a melting point Tm of more than 135 to 170° C.

Preferably, the ethylene homo- or copolymer (PE) is a high density polyethylene (HDPE) having a density of 940 to 960 kg/m$^3$, a low density polyethylene (LDPE) having a density of 900 to less than 940 kg/m$^3$, a linear low density polyethylene (LLDPE) having a density of 900 to less than 940 kg/m$^3$, a PE plastomer having a density of 860 to 890 kg/m$^3$, or mixtures thereof. A polyethylene (PE) plastomer is also known as a very low density (VLDPE) or ultra low (ULDPE) polyethylene which is a special form of linear low density polyethylene (LLDPE) that has a much higher concentration of short-chain branches, thus resulting in very low densities of 860 to 890 kg/m$^3$.

Preferably, the propylene homo- or copolymer (PP) is a propylene homopolymer, a random copolymer with ethylene and/or C4 to C10 alpha-olefins, heterophasic copolymer with ethylene and/or C4 to C10 alpha-olefins, random-heterophasic copolymer with ethylene and/or C4 to C10 alpha-olefins, or mixtures thereof.

The polyolefin composition further comprises at least one organic chromophore. In other words, the polyolefin composition can comprise one organic chromophore, or two or more organic chromophores differing from each other. An organic chromophore is a carbon-based chromophore.

Preferably, the organic chromophore comprises one or more azo groups, more preferably one azo group, or the organic chromophore comprises a substituted isoindoline group. The organic chromophore comprising a substituted isoindoline group preferably further comprises one, more preferably two, barbituric acid group(s). The organic chromophore can also be a mixture of one or more organic chromophores comprising one or more azo groups and one or more organic chromophores comprising a substituted isoindoline group.

The organic chromophore preferably comprises one or more azo groups, more preferably one azo group. Preferably, the organic chromophore comprises, or consists of, disodium 6-hydroxy-5-[(2-methoxy-5-methyl-4-sulfonatophenyl)diazenyl] naphthalene-2-sulfonate, trisodium (4E)-3-oxo-4-[(4-sulfonato-1-naphthyl)hydrazono]naphthalene-2.7-disulfonate, 4-[[2-methoxy-5-[(phenylamino)carbonyl]phenyl]azo]-; n-(2,3-dihydro-2-oxo-1h-benzimidazol-5-yl)-3-hydroxy-2-naphthalenecarboxamide, 4-[(2,5-dichlorophenyl)diazenyl]-N-[4-[[4-[(2.5-dichlorophenyl)diazenyl]-3-hydroxynaphthalene-2-carbonyl]amino]phenyl]-3-hydroxynaphthalene-2-carboxamide, Trisodium 5-hydroxy-1-(4-sulfonatophenyl)-4-[(E)-(4-sulfonatophenyl)diazenyl]-1H-pyrazole-3-carboxylate and mixtures thereof.

Alternatively, the organic chromophore preferably comprises a substituted isoindoline group, more preferably comprises a substituted isoindoline group and further comprises one, more preferably two, barbituric acid group(s). Preferably, the organic chromophore comprises, or consists of, 5,5'-(1H-isoindole-1,3(2H)-diylidene)dibarbituric acid. Mixtures of this organic chromophore comprising a substituted isoindoline group with the above mentioned azo group comprising organic chromophores are also possible.

The aforementioned organic chromophores area also known as "Allura Red" (Disodium 6-hydroxy-5-[(2-methoxy-5-methyl-4-sulfonatophenyl)diazenyl] naphthalene-2-sulfonate, CAS No. 25956-17-6), "Amaranth" (Trisodium (4E)-3-oxo-4-[(4-sulfonato-1-naphthyl)hydrazono]naphthalene-2,7-disulfonate, CAS No. 915-67-3), "Pigment yellow 139" (5,5'-(1H-isoindole-1,3(2H)-diylidene)dibarbituric acid, CAS No. 36888-99-0), "Pigment red 176" (4-[[2-methoxy-5-[(phenylamino)carbonyl]phenyl]azo]-; n-(2, 3-dihydro-2-oxo-1h-benzimidazol-5-yl)-3-hydroxy-2-naphthalenecarboxamide, CAS No. 12225-06-8), "Pigment red 166" (4-[(2,5-dichlorophenyl)diazenyl]-N-[4-[[4-[(2,5-dichlorophenyl)diazenyl]-3-hydroxynaphthalene-2-carbonyl]amino]phenyl]-3-hydroxynaphthalene-2-carboxamide, CAS No. 3905-19-9), and "Tartrazine E102" (Trisodium 5-hydroxy-1-(4-sulfonatophenyl)-4-[(E)-(4-sulfonatophenyl) diazenyl]-1H-pyrazole-3-carboxylate, CAS No. 1934-21-0), and all are commercially available.

Preferably, the organic chromophore is present in an amount of 1 to 100000 ppm by weight, more preferably 5 to 50000 ppm by weight, and most preferably 10 to 25000 ppm by weight, based on the total polyolefin composition of step a).

In step b) the polyolefin composition is mixed in a melt state at a temperature of 170 to 290° C. with an inorganic oxidizing agent. Melt state means that the polyolefin composition is at least partially molten, preferably fully molten. The polyolefin composition being in a melt state not only allows a thorough mixing of the polyolefin composition with the inorganic oxidizing agent but also allows the inorganic oxidizing agent to penetrate and/or diffuse into the bulk of the polyolefin composition, thus enabling to remove and/or to decompose the organic chromophore.

The inorganic oxidizing agent is selected from the group of inorganic peroxides and hypochlorites, preferably the inorganic oxidizing agent is selected from hypochlorites. The inorganic oxidizing agent has the purpose of decoloring the polyolefin composition, usually by decomposing the organic chromophore contained in the polyolefin composition.

According to one embodiment of the present invention, the inorganic oxidizing agent comprises, more preferably consists of, an inorganic peroxide. The inorganic peroxide is preferably selected from $H_2O_2$, peroxide acid, or mixtures thereof. Preferably the peroxide acid comprises, preferably consists of, peroxymonosulfuric acid, peroxydisulfuric acid, peroxynitric acid, peroxyphosphoric acid and mixtures thereof.

According to another embodiment of the present invention, the inorganic oxidizing agent comprises, more preferably consists of, a hypochlorite. The hypochlorite comprises, or consists of, $Ca(OCl)_2$, NaOCl, KClO, LiClO or mixtures thereof, most preferably the hypochlorite comprises, or consists of, $Ca(OCl)_2$.

Preferably, the inorganic oxidizing agent in step b) is added in an amount of 0.1 to 10 wt.-%, more preferably 0.3 to 9 wt.-% with respect to the total polyolefin composition of step a).

Preferably, the inorganic oxidizing agent in step b) is added as a solution in water. This is in particular the case when the inorganic oxidizing agent is a hypochlorite, like $Ca(OCl)_2$.

Mixing in step b) is preferably done by mechanical means, such as a mixer, a kneader, or an extruder. Preferably, the mixing in step b) is performed for 30 to 600 s.

Preferably, the process is a continuous process or a discontinuous process.

According to one embodiment of the present invention, the process is a continuous process and step b) is conducted in an extruder, preferably in a single or twin-screw extruder. Preferably, the continuous process further comprises the steps of degassing and/or pelletizing after step b).

According to another embodiment of the present invention, the process is a discontinuous process and step b) is conducted in a kneader, the kneader preferably being a chamber kneader or a Farell kneader.

Polymeric materials and polymeric waste materials usually comprise one or more additives, which influence the material properties of the polymeric material. Preferably, the polyolefin composition further comprises an additive. The additive preferably comprises one or more stabilizers and/or one or more modifiers. Preferably, the stabilizers are selected from antioxidants, UV stabilizers or combinations thereof. The antioxidants will normally include sterically hindered phenols and/or phosphites or phosphonites. Preferably, the modifiers are selected from acid scavengers, slip agents, antiblocking agents, blowing agents, nucleating agents and antimicrobial agents. Such additives are well known in the art.

In step c) of the process according to the invention, a decolored polyolefin composition is obtained. The decolored polyolefin composition may comprise decomposition products of the organic chromophore. Decoloring of the polyolefin composition is determined by colorimetry according to ISO 11664-4 and described in more detail herein below. The Euclidean distance $\Delta E$ is a measure for the decoloring of the polyolefin composition. In other words, $\Delta E$ is the difference in color between the colored polyolefin composition provided in step a) and the decolored polyolefin composition obtained in step c) of the process according to the invention. Preferably, the $\Delta E$ measured according to ISO 11664-4 of the decolorized polyolefin composition is between 6.0 and 120.0.

Preferably, the polyolefin composition of step a) has a first MFR2 of 0.1 to 100 g/10 min measured according to ISO 1133 and/or the decolorized polyolefin composition obtained in step c) has a second MFR2 of 0.1 to 500 g/10 min measured according to ISO 1133.

Preferably, the polyolefin composition of step a) has a first MFR2 measured according to ISO 1133 and the decolorized polyolefin composition obtained in step c) has a second MFR2 measured according to ISO 1133, wherein the second MFR2 is 1.5·(first MFR2)≥(second MFR2)≥0.9·(first MFR2)

and more preferably the second MFR2 is 1.45·(first MFR2)≥(second MFR2)≥0.95·(first MFR2).

Preferably, the polyolefin composition of step a) has a first oxidation induction time (OIT) measured according to ISO 11357-6 and the decolorized polyolefin composition obtained in step c) has a second OIT measured according to ISO 11357-6, wherein the second OIT is equal or lower than the first OIT, more preferably the second OIT is lower than the first OIT.

The present invention further relates to a decolorized polyolefin composition obtained by the process according to the invention as described in all embodiments. All embodiments of the process according to the invention are also embodiments of the decolorized polyolefin composition, if applicable.

Preferably, the decolorized polyolefin composition has an oxidation induction time (OIT) of 2 to 60 min measured according to ISO 11357-6.

The present invention further relates to the use of an inorganic oxidizing agent selected from the group of inorganic peroxides and hypochlorites for decolorizing a polyolefin composition comprising at least one polyolefin and at least one organic chromophore.

All embodiments of the polyolefin composition and the inorganic oxidizing agent as described herein are also preferred embodiments of the use of the invention, if applicable.

Finally, the present invention relates to a process for recycling a polyolefin composition comprising at least one polyolefin and at least one organic chromophore, the process for recycling comprising the process for decolorizing a polyolefin composition according to the invention as described herein in all embodiments.

All embodiments of the process for decolorizing a polyolefin composition as described herein are also embodiments the process for recycling a polyolefin composition.

Preferably, the process for recycling a polyolefin composition further comprises step a0) of collecting and sorting plastic, in particular waste plastic, so as to provide a polyolefin composition comprising at least one polyolefin and at least one organic chromophore for step a) of the process for decolorizing a polyolefin composition. Step a0) thus takes place before step a). Sorting means that plastic and/or waste plastic made out of colored polyolefin composition(s) are separated from plastic and/or waste plastic made out of colored or non-colored non-polyolefin composition(s), such as polyvinylchloride (PVC), polystyrene (PS), polyethyleneterephthalate (PET) and polyamide (PA) to a high degree of purity. Sorting processes suitable for this are generally known in the art from mechanical recycling of plastic and waste plastic.

Preferably, the process for recycling a polyolefin composition further comprises step d) of downstream processing the obtained decolored polyolefin composition in step c). Step d) thus takes place after step c). Preferably, downstream processing comprises degassing, pelletizing, removing of additives and/or decomposition products of the organic chromophores from the decolored polyolefin composition, forming an article from the decolored polyolefin composition, or combinations thereof.

In the following, the present invention is further illustrated by means of non-limiting examples.

EXAMPLES

1. Measurement Methods
a) Melt Flow Rate

The melt flow rate (MFR) was determined according to ISO 1133 and was indicated in g/10 min. The higher the melt flow rate, the lower the viscosity of the polymer.

The MFR is determined at 190° C. and a loading of 2.16 kg for polyethylene (MFR2), and the MFR is determined at 230° C. and a loading of 2.16 kg for polypropylene (MFR2).

b) Density

Density of the polymer was measured according to ISO 1183-1:2004 (method A) on compression molded specimens prepared according to EN ISO 1872-2 (February 2007) and is given in kg/m$^3$.

c) Decoloring

The Euclidean distance ΔE was calculated according to EN ISO 11664-4 using the equation:

$$\Delta E_{ab}^* = \sqrt{(L_2^* - L_1^*)^2 + (a_2^* - a_1^*)^2 + (b_2^* - b_1^*)^2}$$

with L being the CIELAB lightness, a and b being the CIELAB coordinates, see EN ISO 11664-4.

The higher the ΔE, the higher is the decolorization of the sample.

d) OIT Measurement

The oxidation induction time (OIT) at 200° C. was determined with a TA Instrument Q20 according to ISO11357-6. Calibration of the instrument was performed with Indium and Tin, according to ISO 11357-1. The maximum error in temperature from calibration was less than 0.1 K. Each polymer sample (cylindrical geometry with a diameter of 5 mm and thickness of 1+0.1 mm) with a weight of 10±2 mg was placed in an open aluminium crucible, heated from 25° C. to 200° C. at a rate of 20° C. min$^{-1}$ in nitrogen (>99.95 vol.-% $N_2$, <5 ppm $O_2$) with a gas flow rate of 50 mL min$^{-1}$, and allowed to rest for 5 min before the atmosphere was switched to pure oxygen (>99.95 vol.-% $O_2$), also at a flow rate of 50 mL min$^{-1}$. The samples were maintained at constant temperature, and the exothermal heat associated with oxidation was recorded. The oxidation induction time was the time interval between the initiation of oxygen flow and the onset of the oxidative reaction. Each presented data point was the average of three independent measurements.

e) Melting Temperature

Data were measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of-30 to +225° C. The melting temperature (Tm) was determined from the second heating step.

2. Materials a) Organic Chromophore
AR: Allura Red
(Disodium 6-hydroxy-5-[(2-methoxy-5-methyl-4-sulfonatophenyl)diazenyl] naphthalene-2-sulfonate, CAS No. 25956-17-6)
Ama: Amaranth
(Trisodium (4E)-3-oxo-4-[(4-sulfonato-1-naphthyl)hydrazono] naphthalene-2,7-disulfonate, CAS No. 915-67-3)
PY139: Pigment yellow 139
(5,5'-(1H-isoindole-1,3(2H)-diylidene)dibarbituric acid, CAS No. 36888-99-0)
NCI a: Pigment red 176
(4-[[2-methoxy-5-[(phenylamino)carbonyl]phenyl]azo]-; n-(2,3-dihydro-2-oxo-1h-benzimidazol-5-yl)-3-hydroxy-2-naphthalenecarboxamide, CAS No. 12225-06-8)
NCI b: Pigment red 166
(4-[(2,5-dichlorophenyl)diazenyl]-N-[4-[[4-[(2,5-dichlorophenyl)diazenyl]-3-hydroxynaphthalene-2-carbonyl] amino]phenyl]-3-hydroxynaphthalene-2-carboxamide, CAS No. 3905-19-9)
Tar: Tartrazine E102
(Trisodium 5-hydroxy-1-(4-sulfonatophenyl)-4-[(E)-(4-sulfonatophenyl) diazenyl]-1H-pyrazole-3-carboxylate, CAS No. 1934-21-0)

b) Polymers
PP is a composition comprising a polypropylene homopolymer having an MFR2 of 12 g/10 min, a density of 905 kg/m$^3$, 0.072 wt.-% Irganox B215 (a 2:1 blend of Irgafos 168, CAS-No. 31570-04-4, and Irganox 1010, CAS-No. 6683-19-8, acting as a process and long-term thermal stabilizer, commercially available from BASF AG, Germany), and 0.04 wt.-% calcium stearate (CAS-No. 1592-23-0).
LDPE is a low density polyethylene having an MFR2 of 4 g/10 min, a melting temperature Tm of 111° C., and a density of 922 kg/m$^3$.

c) Oxidizing Agents
Calcium hypochlorite, $Ca(OCl)_2$, was used as solution in deionized water at a concentration of 0.5 mol/l (0.5M solution).
Dicumyl peroxide (DCP), CAS-No. 80-43-3, was used in solid powder form.

3. Results a) Batch Kneader Examples

The chamber of a Brabender Plasticorder dual-rotor chamber kneader with 50 cm$^3$ volume (Brabender, Germany) was flushed right from the beginning with nitrogen (2.5 L/min) and the screw speed was 40 rpm. The temperature was set to 195° C. using an oil thermostat type Lauda Proline P5. 35 g of a dryblend based on polymer and chromophore was added to the chamber and mixed for 2.5 minutes. After this, the oxidizing agent in an amount given in Table 1 below was added. The dryblend with the oxidizing agent was kneaded for 2.5 minutes and then collected and pressed with heating press and cooled down. Afterwards color and gloss measurement were done, where a white paper was the background. Details on the batch kneader examples are given below in Table 1.

TABLE 1

Batch kneader examples

|  | polymer Type | chromophore type | amount wt.-% | conc. wt-ppm | Ox. Agent type | Amount feed | Conc. wt.-% |
|---|---|---|---|---|---|---|---|
| IE1 | PP | NCl a & b | 0.05* | 50 | $Ca(OCl)_2$ | 10 ml 0.5M** | 2.0 |
| IE2 | PP | Ama | 0.05 | 5000 | $Ca(OCl)_2$ | 30 ml 0.5M** | 6.1 |
| IE3 | PP | Tar | 0.05 | 5000 | $Ca(OCl)_2$ | 30 ml 0.5M** | 6.1 |
| IE4 | LDPE | NCl a & b | 0.05* | 50 | $Ca(OCl)_2$ | 10 ml 0.5M** | 2.0 |
| IE5 | LDPE | NCl a & b | 0.05* | 50 | $Ca(OCl)_2$ | 30 ml 0.5M** | 6.1 |
| IE6 | LDPE | AR | 0.05 | 5000 | $Ca(OCl)_2$ | 30 ml 0.5M** | 6.1 |
| IE7 | LDPE | Ama | 0.10 | 10000 | $Ca(OCl)_2$ | 30 ml 0.5M** | 6.1 |
| IE8 | LDPE | Ama | 0.10 | 10000 | $Ca(OCl)_2$ | 40 ml 0.5M** | 8.2 |
| CE1 | PP | Ama | 0.05 | 5000 | DCP | 0.05 wt.-% | 0.05 |
| CE2 | PP | AR | 0.05 | 5000 | DCP | 0.05 wt.-% | 0.05 |
| CE3 | LDPE | Ama | 0.05 | 5000 | DCP | 0.05 wt.-% | 0.05 |
| CE4 | LDPE | Tar | 0.05 | 5000 | DCP | 0.05 wt.-% | 0.05 |

*in alcohol with adjuvants
**in water
DCP dicumyl peroxide

The MFR (2.16 kg), the OIT and the parameters L, a, b for the colorimetry were all measured before decolorization (index "0") and after decolorization (index "D"). ΔMFR, ΔE and ΔOIT are the changes in MFR, E and OIT of the example before and after decolorization. Results are given in Table 2 below.

TABLE 2

Measurements and results

|  | $MFR_0$ g/10 min | $OIT_0$ min | $L_0$ | $a_0$ | $b_0$ | $L_D$ | $a_D$ | $b_D$ | ΔE | $MFR_D$ g/10 min | $OIT_D$ min |
|---|---|---|---|---|---|---|---|---|---|---|---|
| IE1 | 11 | 9.7 | 49.4 | 29.2 | 18.4 | 57.3 | 5.7 | 4.6 | 28.4 | 13.8 | 4.2 |
| IE2 | 11 | 9.7 | 51.0 | 7.8 | 5.6 | 40.7 | 11.1 | 3.5 | 11.0 | 16 | 3.8 |
| IE3 | 11 | 9.7 | 57.7 | 11.5 | 20.3 | 57.3 | 14.9 | 26.7 | 7.3 | 16 | 3.8 |
| IE4 | 3.9 | 36.8 | 44.5 | 29.9 | 25.1 | 39.5 | 5.2 | 4.7 | 32.4 | 3.9 | 17.6 |
| IE5 | 3.9 | 36.8 | 44.5 | 29.9 | 25.1 | 25.7 | 4.9 | 4.2 | 37.6 | 4.0 | 10.1 |
| IE6 | 3.9 | 36.8 | 54.0 | 9.4 | 3.4 | 47.5 | 11.9 | 3.1 | 7.0 | 4.0 | 10.1 |
| IE7 | 3.9 | 36.8 | 46.0 | 8.5 | 1.2 | 38.9 | 10.1 | 1.0 | 7.3 | 4.0 | 10.1 |
| IE8 | 3.9 | 36.8 | 46.0 | 8.5 | 1.2 | 36.5 | 11.2 | 0.9 | 9.9 | 4.1 | 9.9 |
| CE1 | 11 | 9.7 | 42.9 | 9.0 | 4.0 | 40.8 | 11.1 | 3.5 | 3.0 | 45 | 1.1 |
| CE2 | 11 | 9.7 | 44.3 | 13.2 | 12.2 | 45.0 | 13.4 | 7.8 | 4.5 | 45 | 1.1 |
| CE3 | 3.9 | 36.8 | 52.0 | 6.1 | 1.6 | 56.9 | 6.4 | 0.6 | 5.0 | 3.3 | 0.7 |
| CE4 | 3.9 | 36.8 | 46.0 | 7.5 | 1.2 | 45.5 | 8.7 | 1.2 | 1.3 | 3.3 | 0.7 |

|  | ΔE | ΔMFR % | ΔOIT % |
|---|---|---|---|
| IE1 | 28.4 | 25% | −57% |
| IE2 | 11.0 | 45% | −61% |
| IE3 | 7.3 | 45% | −61% |
| IE4 | 32.4 | 0% | −52% |
| IE5 | 37.6 | 3% | −73% |
| IE6 | 7.0 | 3% | −73% |
| IE7 | 7.3 | 3% | −73% |
| IE8 | 9.9 | 5% | −73% |
| CE1 | 3.0 | 309% | −89% |
| CE2 | 4.5 | 309% | −89% |
| CE3 | 5.0 | −15% | −98% |
| CE4 | 1.3 | −15% | −98% |

As can be seen from Table 2 above, the ΔOIT for the inventive examples is lower compared to the comparative examples, for PP as well as the LDPE samples. This shows that the inventive examples had less stabilization loss than the comparative examples.

b) Extruder Examples

A small-scale TSE 24 MC twin-screw extruder (Thermofisher, UK) with 24 mm barrel diameter and an L/D ratio of 40 was used, equipped with a high intensity screw design having three kneading zones. The polymer and pigment were fed as dryblend in the amounts given in Table 3 below through the hopper, the 0.5M solution of the oxidation agent through a feedport between first and second kneading block. Downstream atmospheric degassing was used. The extruder was set at a constant barrel temperature of 190° C., using a screw speed of 300 rpm and 40-60% filling factor in combination with a throughput of 6 kg/h. Resulting melt strands from a triple die were solidified in a waterbath and pelletized subsequently. Details on the extruder examples are given in Table 3 below.

TABLE 3

Extruder examples

|  | Polymer type | Pigment type | Amount wt.-% | Conc. wt-ppm | Ox. agent type | Conc. wt.-% |
|---|---|---|---|---|---|---|
| IE9 | PP | NCl a & b | 0.10* | 100 | $Ca(OCl)_2$ | 0.6 |
| IE10 | PP | NCl a & b | 0.05* | 50 | $Ca(OCl)_2$ | 0.6 |
| IE11 | LDPE | NCl a & b | 1.00* | 1000 | $Ca(OCl)_2$ | 0.6 |
| IE12 | LDPE | NCl a & b | 0.50* | 500 | $Ca(OCl)_2$ | 0.6 |
| IE13 | LDPE | NCl a & b | 0.10* | 100 | $Ca(OCl)_2$ | 0.6 |
| IE14 | LDPE | NCl a & b | 0.05* | 50 | $Ca(OCl)_2$ | 0.6 |

*in alcohol with adjuvants

The MFR (2.16 kg), the OIT and the parameters L, a, b for the colorimetry were all measured or determined before decolorization (index "0") and after decolorization (index "D"). ΔMFR and ΔE are the changes in MFR and E of the sample before and after decolorization. Results are given in Table 4 below.

TABLE 4

| | MFR$_O$ g/10 min | L$_O$ | a$_O$ | b$_O$ | L$_D$ | a$_D$ | b$_D$ | ΔE | MFR$_D$ g/10 min | ΔMFR % |
|---|---|---|---|---|---|---|---|---|---|---|
| | Measurements and results | | | | | | | | | |
| IE9  | 11  | 46.8 | 28.5 | 21.5 | 31.6 | 46.8 | 27.1 | 24.4 | 13  | 18% |
| IE10 | 11  | 40.5 | 22.3 | 28.2 | 18.2 | 77.0 | 44.4 | 61.3 | 13  | 18% |
| IE11 | 3.9 | 42.0 | 39.6 | 31.1 | 31.6 | 52.9 | 35.2 | 17.4 | 3.7 | −5% |
| IE12 | 3.9 | 49.0 | 33.5 | 32.4 | 35.1 | 64.0 | 48.9 | 37.4 | 3.7 | −5% |
| IE13 | 3.9 | 53.2 | 28.7 | 24.3 | 39.5 | 56.8 | 40.8 | 35.3 | 3.7 | −5% |
| IE14 | 3.9 | 62.7 | 12.9 | 64.6 | 63.0 | 21.8 | 56.3 | 12.2 | 3.7 | −5% |

The invention claimed is:

1. A process for decolorizing a polyolefin composition, the process comprising the steps of
   a) providing a polyolefin composition comprising at least one polyolefin and at least one organic chromophore,
   b) mixing the polyolefin composition in a melt state at a temperature of 170 to 290° C. with an inorganic oxidizing agent, wherein the inorganic oxidizing agent is selected from the group of hypochlorites, and
   c) obtaining a decolorized polyolefin composition.

2. The process according to claim 1, wherein the polyolefin has a density of 860 to 960 kg/m³ measured according to ISO 1183 and/or a melting temperature Tm measured according to ISO 11357-3 of 60 to 170° C.

3. The process according to claim 1, wherein the polyolefin is selected from the group of ethylene homo- or copolymers having a density of 860 to 960 kg/m³, propylene homo- or copolymers having a density of 900 to 910 kg/m³, or mixtures thereof.

4. The process according to claim 3, wherein the ethylene homo- or copolymer is a HDPE having a density of 940 to 960 kg/m³, an LDPE having a density of 900 to less than 940 kg/m³, an LLDPE having a density of 900 to less than 940 kg/m³, a plastomer having a density of 860 to 890 kg/m³, or mixtures thereof.

5. The process according to claim 3, wherein the propylene homo- or copolymer is a propylene homopolymer, a random copolymer with ethylene and/or C4 to C10 alpha-olefins, heterophasic copolymer with ethylene and/or C4 to C10 alpha-olefins, random-heterophasic copolymer with ethylene and/or C4 to C10 alpha-olefins, or mixtures thereof.

6. The process according to claim 1, wherein the organic chromophore comprises one or more azo groups or wherein the organic chromophore comprises a substituted isoindoline group.

7. The process according to claim 1, wherein the organic chromophore comprises disodium 6-hydroxy-5-[(2-methoxy-5-methyl-4-sulfonatophenyl)diazenyl] naphthalene-2-sulfonate, trisodium (4E)-3-oxo-4-[(4-sulfonato-1-naphthyl)hydrazono]naphthalene-2,7-disulfonate, 4-[[2-methoxy-5-[(phenylamino)carbonyl]phenyl]azo]-; n-(2,3-dihydro-2-oxo-1h-benzimidazol-5-yl)-3-hydroxy-2-naphthalene-carboxamide, 4-[(2.5-dichlorophenyl)diazenyl]-N-[4-[[4-[(2.5-dichlorophenyl)diazenyl]-3-hydroxynaphthalene-2-carbonyl]amino]phenyl]-3-hydroxynaphthalene-2-carboxamide, trisodium 5-hydroxy-1-(4-sulfonatophenyl)-4-[(E)-(4-sulfonatophenyl)diazenyl]-1H-pyrazole-3-carboxylate, 5,5'-(1H-isoindole-1,3(2H)-diylidene)dibarbituric acid and mixtures thereof.

8. The process according to claim 1, wherein the organic chromophore is present in an amount of 1 to 100000 ppm by weight, preferably to 50000 ppm by weight, more preferably 10 to 25000 ppm by weight, based on the total polyolefin composition of step a).

9. The process according to claim 1, wherein the hypochlorite comprises Ca(OCl)$_2$, NaOCl, KClO, LiClO or mixtures thereof.

10. The process according to claim 1, wherein the inorganic oxidizing agent in step b) is added in an amount of 0.1 to 10 wt.-% with respect to the total polyolefin composition of step a).

11. The process according to claim 1, wherein the ΔE measured according to ISO 11664-4 of the decolorized polyolefin composition is between 6.0 and 120.0.

12. The process according to claim 1, wherein the polyolefin composition of step a) has a first MFR2 measured according to ISO 1133 and the decolorized polyolefin composition obtained in step c) has a second MFR2 measured according to ISO 1133, wherein the second MFR2 is $$1.5 \cdot (\text{first MFR2}) \geq (\text{second MFR2}) \geq 0.9 \cdot (\text{first MFR2}).$$

13. Decolorized polyolefin composition obtained by the process according to claim 1 wherein the difference between the oxidation induction time (OIT) of the decolorized polyolefin composition of (a) and the polyolefin composition of (a) expressed as percentage (ΔOIT %) is between −73% and −52% inclusive.

14. A process for decolorizing a polyolefin composition comprising at least one polyolefin and at least one organic chromophore, comprising using an inorganic oxidizing agent selected from the group of hypochlorites to decolorize the polyolefin composition.

15. Process for recycling a polyolefin composition comprising at least one polyolefin and at least one organic chromophore, the process for recycling comprising the process for decolorizing a polyolefin composition according to claim 1.

* * * * *